(12) United States Patent
Matsui (10) Patent No.: US 7,506,875 B2
(45) Date of Patent: Mar. 24, 2009

(54) SEALING DEVICE (75) Inventor: Hiroki Matsui, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/582,346

(22) PCT Filed: Dec. 1, 2004

(86) PCT No.: PCT/JP2004/017847

§ 371 (c)(1),
(2), (4) Date: Jun. 9, 2006

(87) PCT Pub. No.: WO2005/057058

PCT Pub. Date: Jun. 23, 2005

(65) Prior Publication Data

US 2007/0182104 A1 Aug. 9, 2007

(30) Foreign Application Priority Data

Dec. 9, 2003 (JP) ............................. 2003-410490

(51) Int. Cl.
*F16J 15/32* (2006.01)
(52) U.S. Cl. ...................... 277/559; 277/553
(58) Field of Classification Search ............. 277/552, 277/559
See application file for complete search history.

(56) References Cited

U.S. PATENT DOCUMENTS 4,084,826 A 4/1978 Vossieck et al. ............. 277/134
6,276,691 B1 * 8/2001 Nishigaki et al. ........... 277/353

FOREIGN PATENT DOCUMENTS

| GB | 1 219 272 | 1/1971 |
| JP | 90-042463 | 2/1997 |
| JP | 10-019135 | 1/1998 |
| JP | 11-311338 | 9/1999 |
| JP | 2000-310338 | 11/2000 |
| JP | 2003-254439 | 9/2003 |

OTHER PUBLICATIONS

Korean Office Action dated Jun. 26, 2008.

* cited by examiner

*Primary Examiner*—Vishal Patel
(74) *Attorney, Agent, or Firm*—Jacobson Holman PLLC (57) ABSTRACT

On a seal lip, first screw projections are arranged from an atmosphere side slope surface to the middle of a sliding surface, and second screw projections are arranged on the sliding surface. The end section on the sliding surface side of a first screw projection has a shape (cutout section as if the section is cut out along the sliding surface, and a portion on the atmosphere side slope surface side of the first screw projection has an equi-width section with a shape where the height of the section increases toward the atmosphere side with the width kept substantially the same. Therefore, a sealing device is easily processed, and, at an early stage and for permanence, the sealing device provides a screw pump effect that exhibits excellent sealing ability for a long period.

1 Claim, 7 Drawing Sheets

SEALING DEVICE

This is a nationalization of PCT/JP04/017847 filed Dec. 1, 2004 and published in Japanese.

TECHNICAL FIELD

The present invention relates to a sealing device for rotation and rolling used for a shaft sealing part of various kinds of apparatuses and, in particular, to a structure having screw projections on a seal lip.

BACKGROUND ART

A sealing device for rotation and rolling has screw projections on a seal lip sometimes. This is because the screw pump effect produced by the screw projections can enhance sealing ability.

Figure 8:
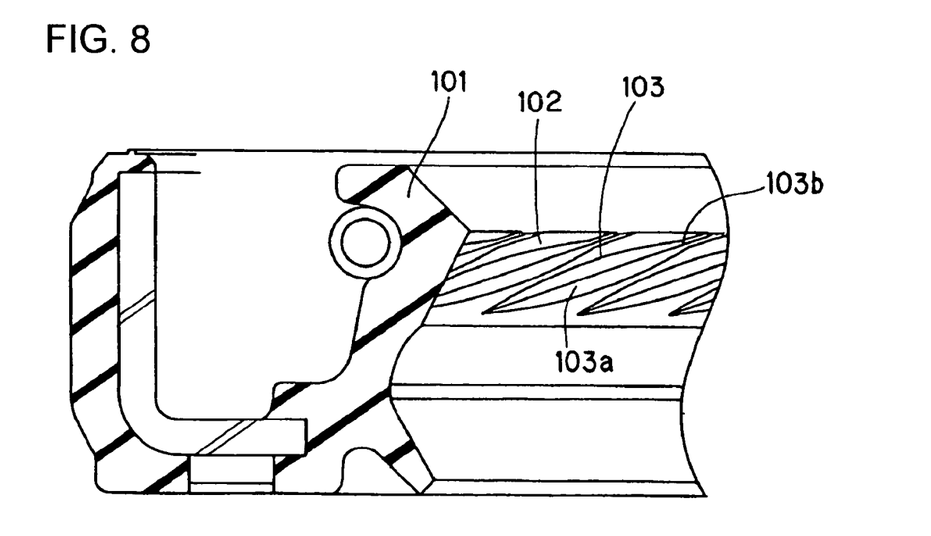
FIG. 8 is a cross-sectional view of a conventional sealing device.

FIG. 8 shows the construction of a conventional sealing device disclosed in a patent document 1. This sealing device has a seal lip 101 having a wedge-shaped cross section. Screw projections 103 are formed on the atmosphere side slope surface 102 of the seal lip 101. The screw projection 103 is formed in the shape of a combination of a ship bottom screw portion 103a shaped like a ship bottom and a parallel screw portion 103b in which height and width are nearly constant. The parallel screw portion 103b plays the role of securing sealing ability at an early stage and the ship bottom portion 103a plays the role of preventing a decrease in the sealing ability during the progress of wear of the seal lip 101.

Figure 9:
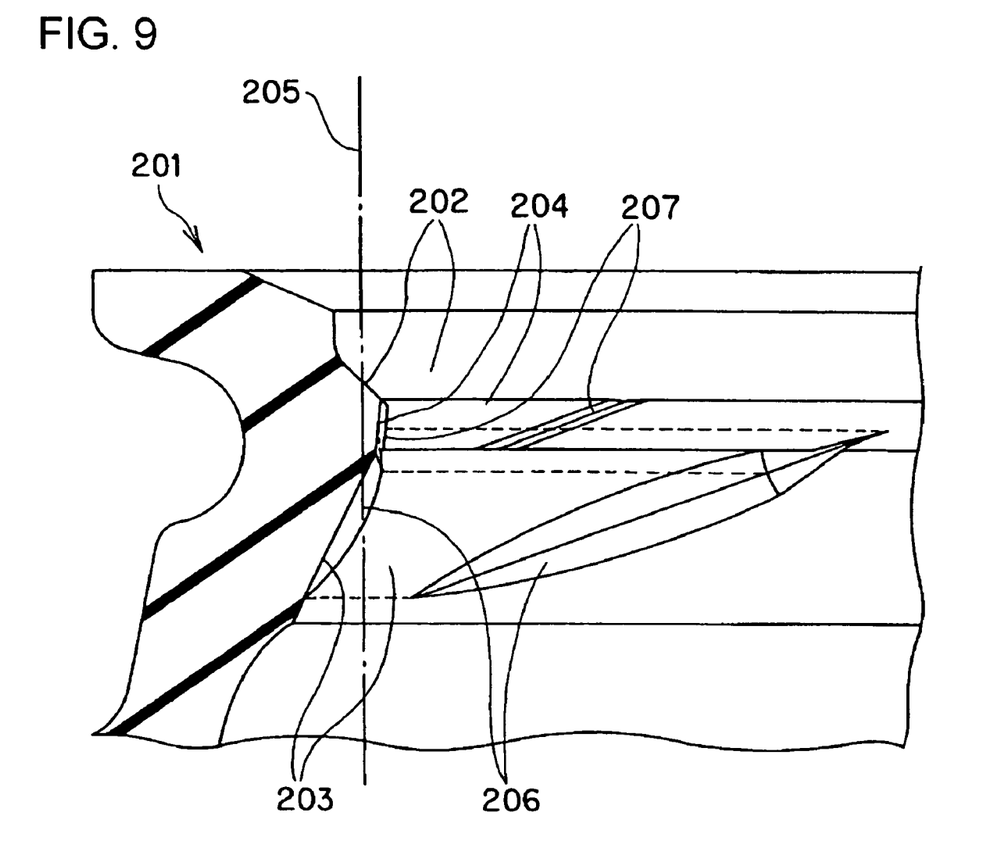
FIG. 9 is a cross-sectional view of another conventional sealing device.

FIG. 9 shows the construction of a conventional sealing device disclosed in a patent document 2. The seal lip 201 of this sealing device has a sliding surface 204 extending along the peripheral surface of a shaft 205 between a slope surface 202 on a sealed object side and a slope surface 203 on an atmosphere side. Screw projections 206 are formed from the slope surface 203 on the atmosphere side to the sliding surface 204. The screw projection 206 is basically formed in the shape of a ship bottom and the end portion on the sliding surface 204 side is formed in a shape cut out along the sliding surface 204. Moreover, the sliding surface 204 has parallel screws 207.

Figure 10:
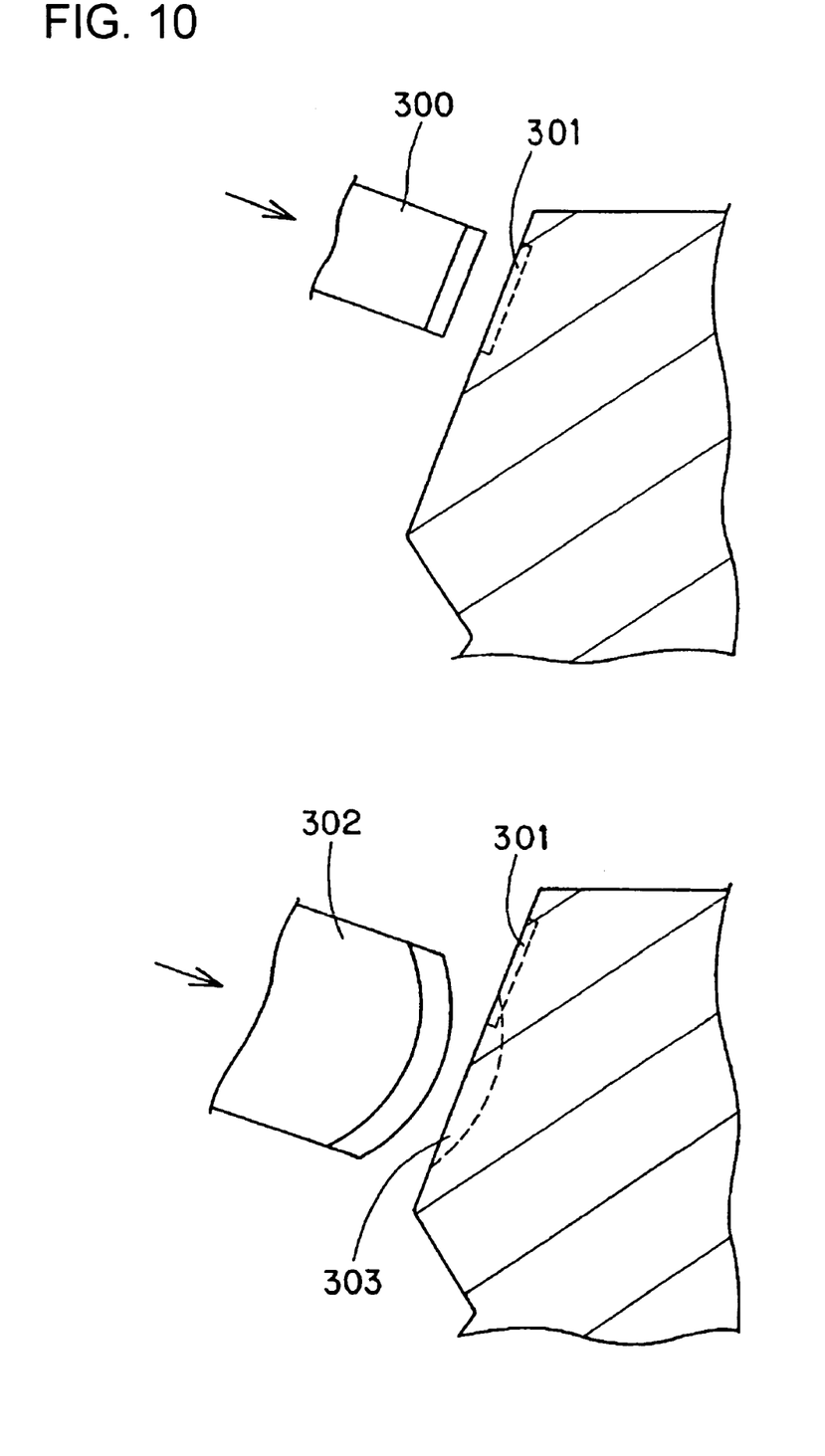
FIG. 10 is a schematic diagram showing a state when a depression corresponding to a screw projection shown in FIG. 8 is formed in a molding die.

In general, a sealing device made of a rubber-like elastic body is manufactured by pouring rubber raw material into a molding die and by vulcanizing the material. When screw projections are formed on the seal lip, depressions corresponding to the shape of screw are formed previously in the molding die by pressing a tool such as a cutter onto the molding die. For example, in the case of the screw projection 103 of the sealing device shown in FIG. 8, as shown in FIG. 10, a depression 301 corresponding to the parallel screw portion 103b is formed by a cutter 300 having a straight cutting edge and then a depression 303 corresponding to the ship bottom screw portion 103a is formed by a cutter 302 having an arc-shaped cutting edge.

[Patent document 1] Japanese Laid-Open Patent Publication No. 9-42463

[Patent document 2] Japanese Laid-Open Patent Publication No. 2003-254439

DISCLOSURE OF THE INVENTION

Problems that the Invention is to Solve

In the sealing device of the above-mentioned construction, usually, a screw pump effect becomes higher as the screw projections increase in number and the height of the screw projection becomes higher.

However, there is such a trade-off relationship as will be described below between the number of screw projections and the height of the screw projection.

That is, in order to increase the height of the screw projection, the cutting depth of the cutter needs to be increased in the processing of a molding die. Then, the increasing of the cutting depth increases not only the height of the screw projection but also the width of the screw projection. When the space between neighboring screw projections is made too small, however, there is restriction that a space is caused in the sliding portion of the seal lip to thereby degrade sealing ability. Therefore, when the height of the screw projection is increased, the screw projections need to be decreased in number in order to secure the space between the screw projections.

The present invention has been made in view of the above-mentioned circumstances. The object of the present invention is to provide a sealing device that can be easily processed and can exert excellent sealing ability produced by a screw pump effect at an early stage and for permanence for a long period.

Means for Solving the Problems

To achieve above-mentioned object, the present invention provides a sealing device that tightly seals an annular space between two members combined with each other in such a way as to rotate relatively to each other and has a seal lip sliding on a peripheral surface of one member of the two members, characterized in that the seal lip comprises: a sliding surface along the peripheral surface; a slope surface that slopes in such a way as to gradually enlarge a space with respect to the peripheral surface from an atmosphere side end edge of the sliding surface; first screw projections formed from the slope surface to a middle of the sliding surface; and second screw projections formed on the sliding surface, wherein an end on a sliding surface side of the first screw projection is formed in a shape cut out along the sliding surface, and a portion on a slope surface side of the first screw projection has an equal width portion formed in a shape in which height increases toward an atmosphere side with a width kept a nearly equal width.

Because a sliding portion between the seal lip and the peripheral surface of the member is a surface (sliding surface), a contact pressure at the early stage of an operation can be reduced as compared with a conventional wedge-shaped lip. This can retard the progress of wear of the sliding portion of the seal lip and can elongate the life of the sealing device.

Moreover, because the first screw projections are formed from the slope surface on the atmosphere side to the middle of the sliding surface, the first screw projections are brought into appropriate contact with the peripheral surface of the member in either of two cases of a long-duration operation (in which wear progresses) and the early stage of the operation. That is, at the early stage of the operation, of the screw projection, a screw portion arranged on the sliding surface is brought into contact with the peripheral surface of the member to exert a screw pump effect to secure sealing ability at an early stage, whereas when the wear progresses in the screw portion, a screw portion arranged on the slope surface is brought into contact with the peripheral surface of the member to keep and enhance the screw pump effect to thereby prevent a decrease in the sealing ability when wear progresses. In addition, the second screw projections formed on the sliding surface assist screw portions arranged on the sliding surface of the first screw projections and enhance the screw pump effect at the time of the early stage of the operation. Therefore, it is possible to exert excellent sealing ability produced by screw pump effect at the early stage and for permanence for a long period.

Furthermore, the equal width portion of the first screw projection is formed in a shape in which height increases toward the atmosphere side with the width kept the nearly equal width. Therefore, it is possible to increase the height of the first screw projection without decreasing the number of first screw projections and to enhance the screw pump effect.

In above-mentioned sealing device, it is preferable that the equal width portion has a cross section of a nearly pentagonal shape formed by cutting off both bottom side ends of a triangle.

A depression corresponding to the shape of this screw can be easily formed by pressing a cutter, whose cutting edge has a cross section nearly shaped like a pentagon, onto a molding die. Moreover, by forming a cutout at the end portion of the cutting edge of the cutter, the shape of the end portion on the sliding surface side of the first screw projection (cut-out shape) can be processed at the same time by one cutting operation. Therefore, it is possible to simplify and facilitate the processing of a molding die of the sealing device.

The shape of the cutout includes a straight cutout and an R-shaped (round shaped) curved cutout and either one can be used. However, when the cutter having a straight cut-out shape is used, the processing of the cutter itself is made easy and when the cutter is pressed onto the molding die, even if the cutter is slightly shifted in position in the axial direction, the height (height from the sliding surface) of cutout portion of the screw projection is hardly affected. Therefore, it is possible to reduce variations in sealing performance caused by processing accuracy.

EFFECT OF THE INVENTION

According to the present invention, the sealing device can exert excellent sealing ability provided by the screw pump effect at an early stage and for permanence for a long period and can be easily processed.

BEST MODE FOR CARRYING OUT THE INVENTION

Hereinafter, with reference to the drawings, preferred embodiments of this invention will be described in detail by way of example. However, it is not intended to limit the scope of this invention only to the size, material, shape, and relative arrangement of constituent parts described in this embodiment, unless particularly specified.

(Construction of Sealing Device)

Figure 1:
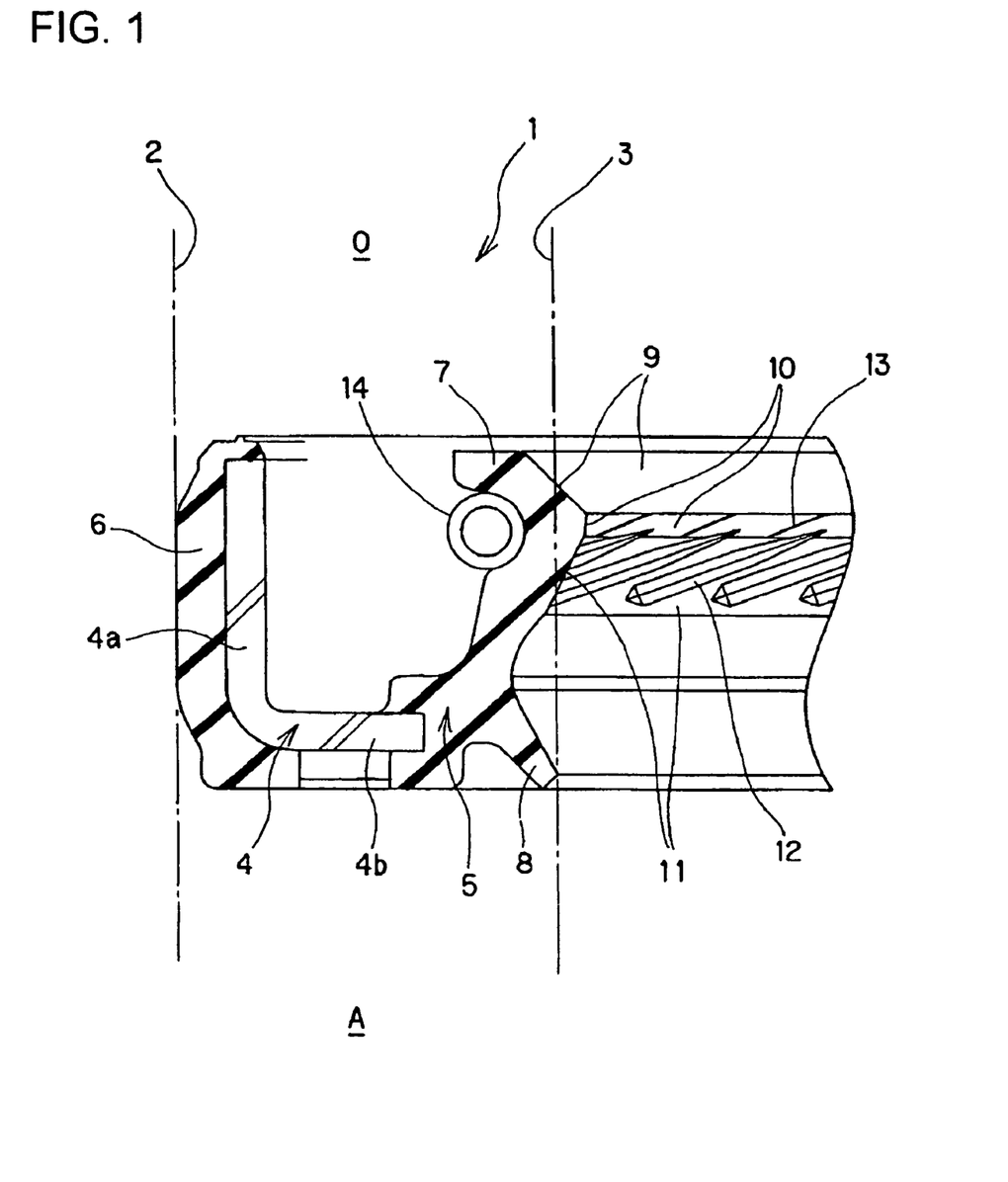
FIG. 1 is a cross-sectional view of a sealing device in accordance with an embodiment of the present invention.
Figure 2:
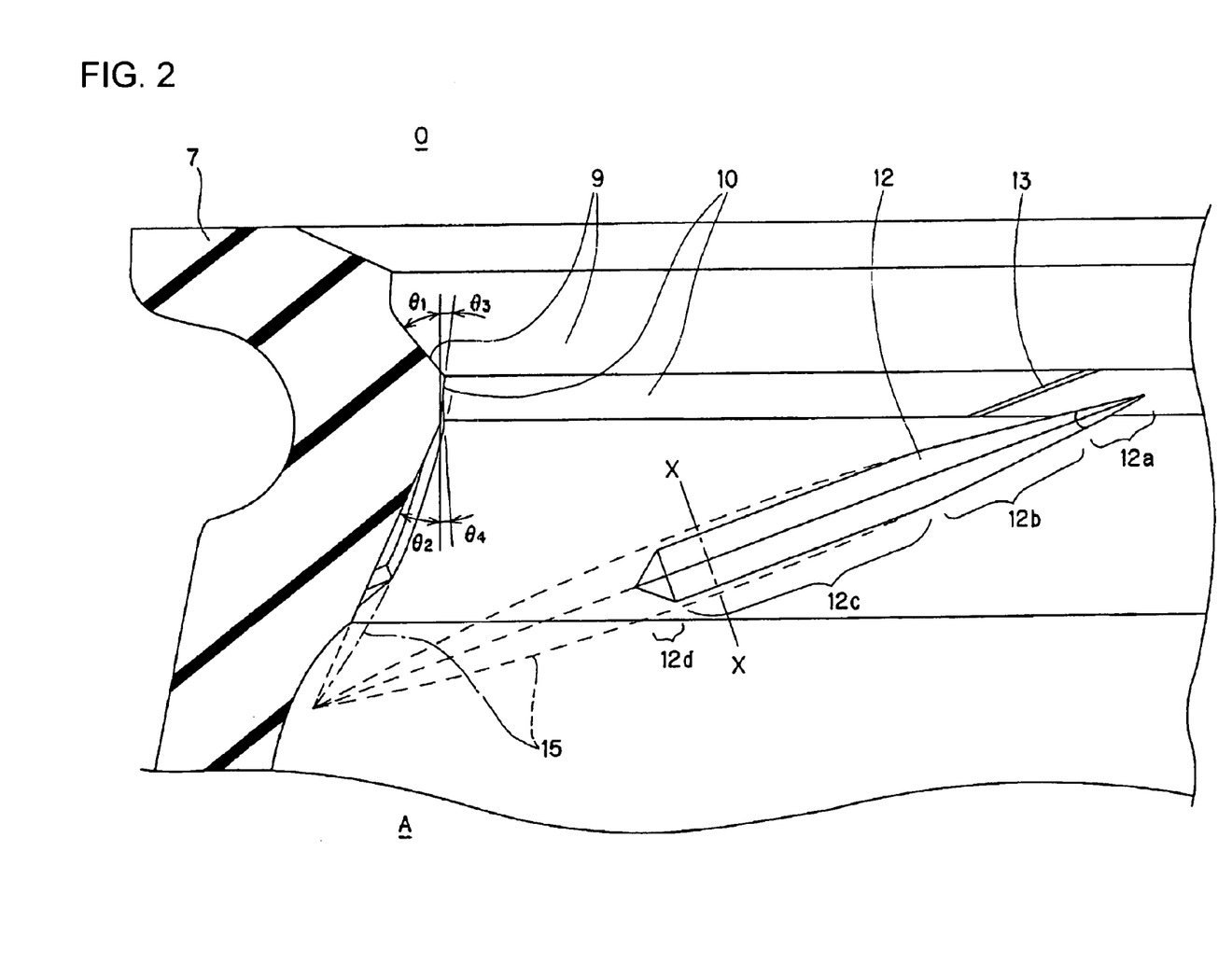
FIG. 2 is a cross-sectional view of a main portion of the sealing device in FIG. 1.
Figure 3:
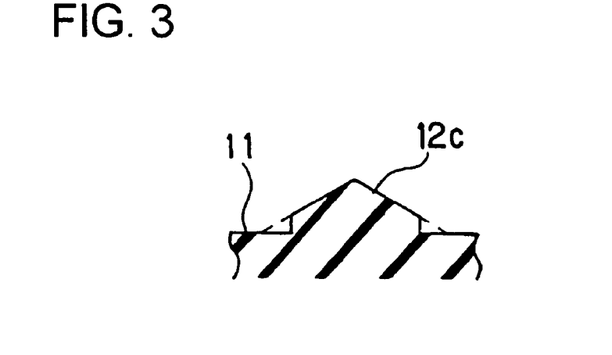
FIG. 3 is a cross-sectional view taken on a line X-X in FIG. 2.

The construction of a sealing device in accordance with one embodiment of the present invention is shown in FIG. 1 to FIG. 3. FIG. 1 is schematic cross-sectional view of a sealing device 1 of this embodiment. FIG. 2 is a cross-sectional view of a main portion of the sealing device 1. FIG. 3 is a cross-sectional view taken on a line X-X in FIG. 2.

This sealing device 1 is a device that is fitted in an annular space between a housing 2 and a shaft 3 of two members, which are combined coaxially with each other in such a way as to rotate freely relatively to each other, and tightly seals the annular space to prevent the leakage of an object to be sealed such as oil.

The sealing device 1 is constructed of a ring-shaped seal main body 5 fitted on the inner peripheral surface of a shaft bore made in the housing 2 and a reinforcing ring 4 for applying fitting rigidity to this seal main body 5.

The reinforcing ring 4 is a ring-shaped member that has a cylindrical portion 4a formed along the inner peripheral surface of the shaft bore and an inward flange portion 4b extending inward in a radial direction from an end on an atmosphere side A of the cylindrical portion 4a and is shaped like a letter L in cross section and is made of metal.

The seal main body 5 is made of a rubber-like elastic body that is integrally burned and fixed to the outer peripheral surface of the cylindrical portion 4a of the reinforcing ring 4 and to an end surface on the atmosphere side A and an end surface on the sealed object side O of the inward flange portion 4b.

Of the seal main body 5, an outer peripheral seal portion 6 fixed to the outer peripheral surface of the cylindrical portion 4a of the reinforcing ring 4 has a specified interference with respect to the inner peripheral surface of the shaft bore of the housing 2. The outer peripheral seal portion 6 has fitting rigidity applied thereto from the cylindrical portion 4a of the reinforcing ring 4, thereby being tightly fixed to the inner peripheral surface of the shaft bore and preventing the leakage of the object to be sealed from the inner peripheral surface of the shaft bore. In this regard, the outer seal portion 6 is not an essential constituent requirement but construction (metal fitting type) in which the cylindrical portion 4a of the reinforcing ring 4 is directly fitted on the inner peripheral surface of the shaft bore can be also employed.

In contrast, on the shaft 3 side of the seal main body 5, there are formed a seal lip 7 extending radially inwardly from the inner end of the inward flange portion 4b of the reinforcing ring 4 toward the sealed object side O and a dust lip 8 extending radially inwardly toward the atmosphere side A.

The dust lip 8 is shaped like a plate in cross section and its lip tip is brought into sealing contact with the peripheral surface of the shaft 3 in such a way as to freely slide on its peripheral surface. This can prevent dust from coming in from the atmosphere side A.

The seal lip 7 has a sealed object side slope surface 9 that faces the sealed object side O, an atmosphere side slope surface 11 that faces the atmosphere side A, and a sliding surface 10 interposed between the sealed object side slope surface 9 and the atmosphere side slope surface 11.

The sealed object side slope surface 9 of the seal lip 7 is sloped from the end edge on the sealed object side O of the sliding surface 10 to the sealed object side O in such a way as to gradually enlarge the clearance between the slope surface 9 and the peripheral surface of the shaft 3. It is preferable that an angle of inclination $\theta_1$ (FIG. 2) between the object side slope surface 9 and the peripheral surface of the shaft 3 is set within a range of $45°\pm10°$.

In contrast, the atmosphere side slope surface 11 of the seal lip 7 is sloped from an end edge on the atmosphere side A of the sliding surface 10 to the atmosphere side A in such a way as to gradually enlarge the clearance between the slope surface 11 and the peripheral surface of the shaft 3. It is preferable that an angle of inclination $\theta_2$ between the atmosphere side slope surface 11 and the peripheral surface of the shaft 3 is set within a range of $25°\pm10°$.

The sliding surface 10 is formed in such a way as to extend along the peripheral surface of the shaft 3 between the sealed object side surface 9 and the atmosphere side slope surface 11. That is, in the lip tip of the seal lip 7, the sealed object side slope surface 9, the sliding surface 10, and the atmosphere side slope surface 11 are continuously formed from the sealed object side O to the atmosphere side A to construct a flat type sliding portion nearly shaped like a trapezoid in cross section.

In this regard, it is preferable that an angle θ3 of inclination between the sliding surface 10 and the peripheral surface of the shaft 3 is set within a range of 10°±10°. In other words, it is preferable that the sliding surface 10 is sloped and set in such a way as to extend along the peripheral surface of the shaft 3 on the whole but to enlarge the clearance between the sliding surface 10 and the peripheral surface of the shaft 3 gradually and slightly toward the atmosphere side A. However, a relationship of θ3<θ2 needs to be satisfied.

The lip tip of the above-mentioned construction, as shown in FIG. 1, has a specified interference with respect to the peripheral surface of the shaft 3. Hence, when the sealing device 1 is fitted on the shaft 3, the seal lip 7 is elastically deformed so as to enlarge the diameter and is brought into sealing contact with the peripheral surface of the shaft 3 by its elastic restoring force in such a way as to freely slide. A garter spring 14 for providing the lip tip with a straining force applied to the shaft 3 is fitted at a position that is exactly the back of the sliding surface 10 on the outer peripheral side of the seal lip 7.

(Construction of Screw Projections)

In the sealing device 1 of this embodiment, first screw projections 12 are formed from the atmosphere side slope surface 11 to the middle of the sliding surface 10 of the seal lip 7. Second screw projections 13 are formed on the sliding surface 10 of the seal lip 7. The first screw projections 12 and the second screw projections 13 are formed in nearly parallel to each other so as to be sloped with respect to the axis.

The first screw projection 12 is broadly constructed of four portions. For detail, the first screw projection 12 is formed of: in order from the sealed object side O (tip side), a cutout portion 12a formed in a shape cut out along the sliding surface 10; an increasing width portion 12b formed in a shape in which width and height gradually increase toward the atmosphere side A (rear end side) on the atmosphere side slope surface 11; an equal width portion 12c formed in a shape in which the height gradually increases toward the atmosphere side A with width kept a nearly equal width; and a rear end portion 12d formed in a shape cut out so as to decrease the width and height sharply.

The cutout portion 12a is formed on the sliding surface 10 and its tip extends to the middle of the sliding surface 10. It is preferable that an angle θ4 between the cutout portion 12a and the peripheral surface of the shaft 3 is set within a range of from 0° to 45°. In other words, it is preferable that the cutout portion 12a is formed in nearly parallel to the peripheral surface of the shaft 3 or is sloped so as to gradually enlarge the clearance between itself and the peripheral surface of the shaft 3 toward the sealed object side O.

The increasing width portion 12b, the equal width portion 12c, and the rear end portion 12d are formed on the atmosphere side slope surface 11 and its rear end extends close to the end edge of the atmosphere side slope surface 11. The increasing width portion 12b has a nearly triangular cross section but the equal width portion 12c has a nearly pentagonal cross section in which both bottom side ends of a triangle are cut off (refer to FIG. 3).

The ridge line of the first screw projection 12 changes smoothly from the increasing width portion 12b to the equal width portion 12c. The ridge line becomes discontinuous between the cutout portion 12a and the increasing width portion 12b and between the equal width portion 12c and the rear end portion 12d, and its internal angle becomes a convex angle (angle smaller than 180°) in these portions.

The shape of the first screw projection 12 of the above-mentioned construction can be described as follows. As shown by broken lines in FIG. 2, consider an imaginary ship bottom screw 15 that extends from the sliding surface 10 across the atmosphere side slope surface 11 to a position on the atmosphere side. It can be said that the first screw projection 12 is formed in a shape in which the end portion on the sealed object side O and a portion close to the end edge of the atmosphere side slope surface 11 (portion nearly at the middle of the ship bottom screw 15) of the ship bottom screw 15 are cut out and in which both side portions are cut out so as to narrow the width of the ship bottom screw 15.

In contrast, the second screw projection 13 is formed from the end edge on the atmosphere side A to an end edge on the sealed object side O of the sliding surface 10. The second screw projection 13 is shaped like a parallel screw in which both of height and width are nearly constant.

When an air leak test was conducted on a so-called flat lip having the sliding surface 10 nearly parallel to the shaft 3 by variously changing the height of the second screw projection 13, it was found that air leak when the height was 0.06 mm or more (where test conditions were as follows: air pressure was 30 kPa; eccentricity was 0 mm TIR; temperature was room temperature; and initial lubrication was dry). Therefore, it is preferable that the height of the second screw projection 13 is set 0.05 mm or less.

In this sealing device 1 of this construction, at the early stage of operation, first, the sliding surface 10, the cutout portions 12a of the first screw projections 12 and the second screw projections 13 are brought into contact with the peripheral surface of the shaft 3. Hence, the suction effect produced by the sliding surface 10 and the screw pump effect produced by the first screw projections 12 and the second screw projections 13 can provide excellent sealing ability and hence can surely prevent the leakage of the object to be sealed from the sealed object side O.

Moreover, when the wear of the tips of the first screw projections 12 progresses at the time of a long operation, the contact width of the sliding surface 10 increases. In response to the increasing contact width, the increasing width portions 12b and the equal width portions 12c of the first screw projections 12 are brought into contact with the peripheral surface of the shaft 3 and the contact widths of the first screw projections 12 also increase. In this regard, the term of "contact width" means a width in an axial direction in the contact surface with the peripheral surface of the shaft 3. That is, the contact width of the first screw projection 12 depends on the width and height of the projections.

The screw pump effect produced by the first screw projection 12 is determined by the ratio between the contact width of the sliding surface 10 and the contact width of the first screw projection 12. According to the construction of this embodiment, the contact width of the first screw projection 12 increases as the wear progresses. Hence, it is possible to keep excellent sealing ability without degrading sealing ability even at the time of a long operation.

In this manner, the first screw projections 12 extend along the atmosphere side slope surface 11 and the sliding surface 10. With this, it is possible to secure sealing ability at the early stage by the cutout portion 12a and to prevent a decrease in sealing ability also when wear progresses. Hence, it is possible to exert excellent sealing ability at the early stage and for permanence for a long period.

In addition, the equal width portion 12c of the first screw portion 12 is formed in a shape in which height increases toward the atmosphere side A with the width kept the nearly equal width. Hence, it is possible to increase the height of the first screw projection 12 without decreasing the number of first screw projections 12 and to enhance the screw pump effect when wear progresses.

Furthermore, in this embodiment, the so-called flat flip in which the sliding portion of the lip tip is formed in a plane (sliding surface 10) is employed. Hence, it is possible to reduce a fastening pressure at the early stage of operation as compared with a conventional wedge-shaped lip. This can retard the progress of wear at the lip tip and hence can elongate the life of the sealing device 1.

(Method for Forming Screw Projections)

Furthermore, according to the sealing device 1 of this embodiment, it is possible to process a molding die and the sealing device itself with ease by employing the above-mentioned construction. Hereinafter, this point will be described in detail.

In general, a sealing device made of a rubber-like elastic material is manufactured by pouring a rubber raw material into a molding die and by vulcanizing the rubber raw material. Hence, in order to form a screw projection on a seal lip, a depression meeting the shape of screw needs to be previously formed in a molding die.

In the case of a screw projection of a combination of two kinds of screw shapes shown in FIG. 8, depressions corresponding to parallel screw portions and depressions corresponding to ship bottom screw portions need to be formed by individual cutters (refer to FIG. 10). This is because the parallel screw portions are discontinuously connected in a connection portion to the ship bottom screw portions and the internal angle of the connection portions become concave angles. This is ascribable to the fact that, in general, it is extremely difficult to make a cutter capable of processing the depression corresponding to this concave angle by one cutting operation.

In contrast, the depression corresponding to the shape of the first screw projection 12 of this embodiment can be formed by one cutting operation by the use of a cutter having a cutout on the tip of a cutting edge. That is, it is possible to realize a screw projection, which produces the same effect as the combination of the parallel screw and the ship bottom screw, with more ease.

Figure 4:
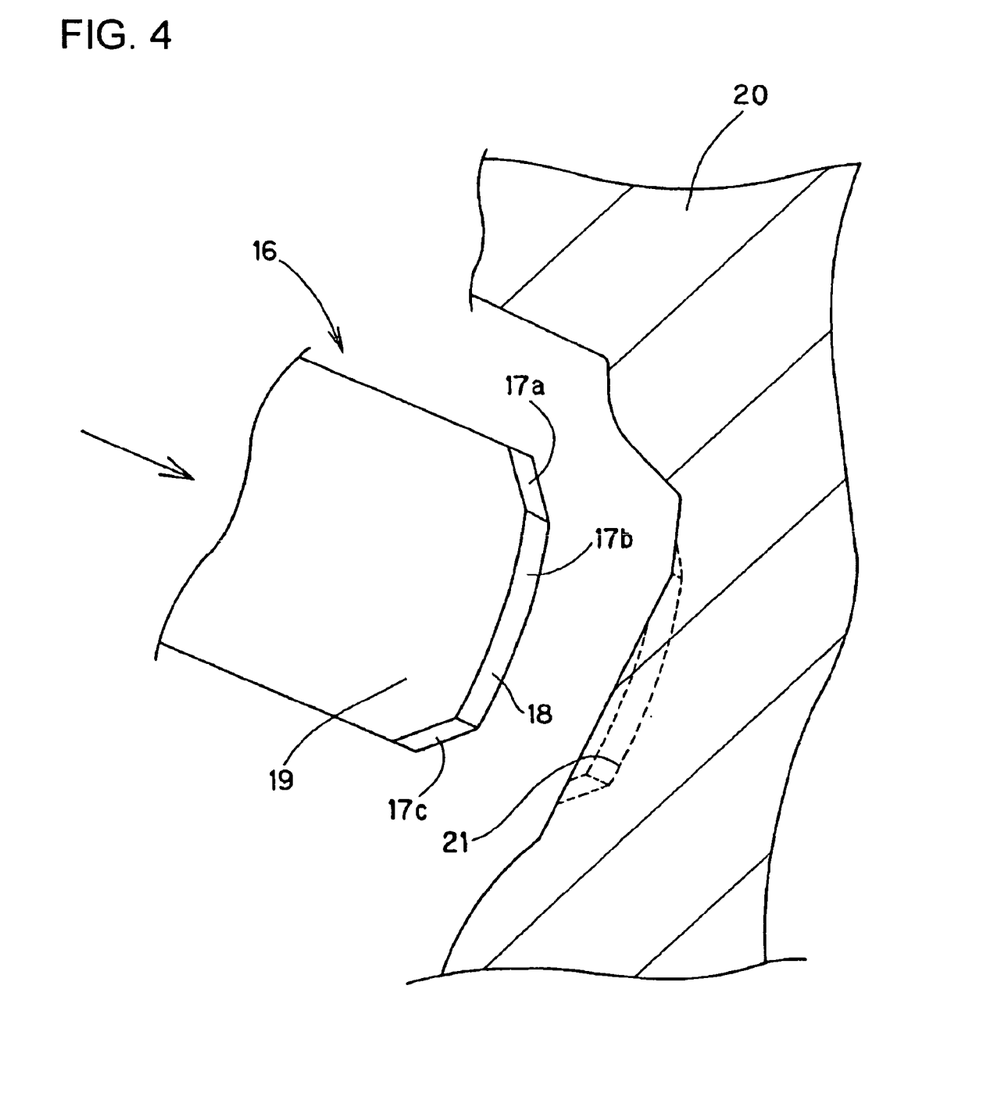
FIG. 4 is a schematic diagram showing a state when a depression corresponding to a screw projection shown in FIG. 2 is formed in a molding die.

A method for processing a specific molding die will be described with reference to FIG. 4. FIG. 4 is a diagram showing a state when a depression corresponding to the first screw projection 12 is formed on a molding die.

The cutting edge of a cutter 16 is formed of a tip side cutout portion 17a, an arc-shaped portion 17b, and a rear end side cutout portion 17c. Both of the internal angle of the connection portion of the tip side cutout portion 17a and the arc-shaped portion 17b and the internal angle of the connection portion of the arc-shaped portion 17b and the rear end side cutout portion 17c are convex angles. Moreover, cutting surfaces 18 on both sides form the shape of a mountain. The cutter 16 having a cutting edge shape like this can be made with comparative ease.

This cutter 16 is pressed onto a molding die 20 to form a depression 21 corresponding to the first screw projection 12. At this time, the tip side cutout portion 17a forms a depression corresponding to the cutout portion 12a of the first screw projection 12; the arc-shaped portion 17b forms a depression corresponding to the increasing width portion 12b and the equal width portion 12c; and the rear end side cutout potion 17c forms a depression corresponding to the rear end portion 12d, respectively. Moreover, when the cutter 16 is pressed onto the molding die 20, the side surface 19 of the cutter 16 is pressed into the molding die 20 at the arc-shaped portion 17b by a specified depth. With this, a depression having a cross section nearly shaped like a pentagon corresponding to the equal width portion 12c can be formed.

In this manner, according to the construction of this embodiment, a screw portion formed in two different shapes can be inscribed in the molding die by one operation, which results in simplifying and facilitating the processing of the molding die.

Moreover, the cutout portion 12a and the rear end portion 12d of the first screw projection 12 are formed in a shape cut out linearly. With this, the processing of the cutter 16 can be made easy and when the cutter 16 is pressed onto the molding mold 20, even if the cutter 16 is slightly shifted in position in an axial direction, the height of the cutout portion 12a of the first screw projection 12 is not affected and hence variations in sealing ability caused by processing accuracy can be reduced.

Further, the lip tip is formed by the sliding surface 10. Hence, this eliminates the need for performing the process of knife cutting and hence makes it possible to manufacture a seal main body only by molding, which results in simplifying and facilitating the processing of the sealing device itself.

(Modification)

In the above-mentioned embodiment, a ship bottom mold having an arc-shaped ridge line is used as the first screw projection. However, the shape of the first screw projection is not limited to this but various screw shapes can be used. One example will be shown in FIG. 5.

Figure 5:
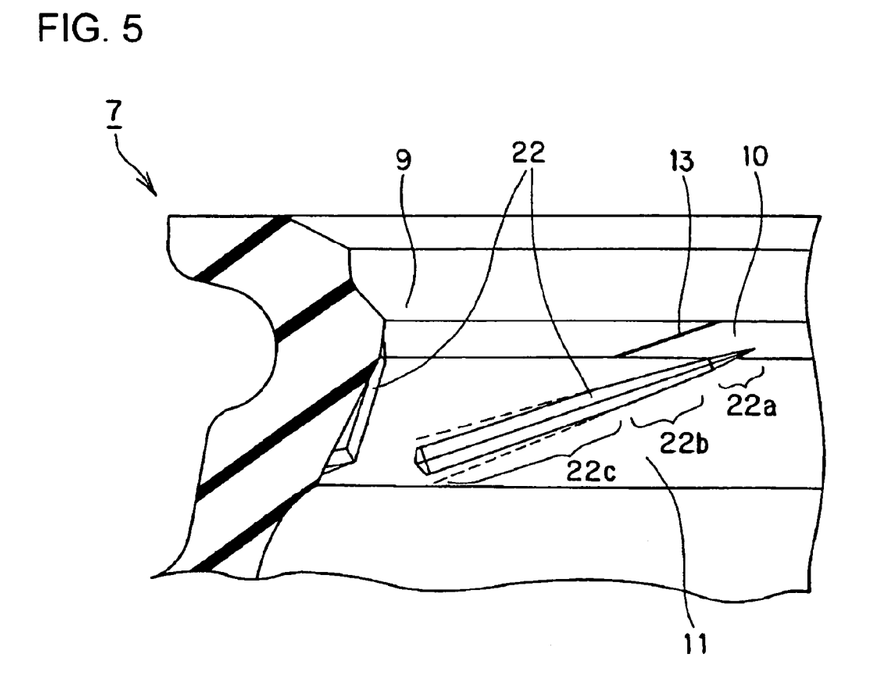
FIG. 5 is a cross-sectional view showing a modification of a sealing device.

In FIG. 5, a first screw projection 22 shaped like a taper is formed in the area from the atmosphere side slope surface 11 to the middle of the sliding surface 10 of the seal lip 7. The first screw projection 22 has a basic shape of a tapered shape in which height and width increase toward the atmosphere side, but the end portion on the sliding surface 10 side (cutout portion 22a) is formed in a shape cut out along the peripheral surface of the shaft. Moreover, just as with the first screw projection in the above-mentioned embodiment, the first screw projection 22 has an increasing width portion 22b and an equal width portion 22c.

Even in the case of the first screw projection 22 of this shape, the same effect as the first screw projection in the above-mentioned embodiment can be produced.

In this regard, the above-mentioned embodiment and the modification show only specific examples of the present invention by way of example. The scope of the present invention is not limited to the above-mentioned shape but the invention can be variously modified within the scope of its technical idea.

EXAMPLE 1

A comparative test of the quantity of pump was conducted by the use of an example of the sealing device of the above-mentioned construction and comparative examples 1, 2 of the wedge-shaped lip.

The sealing device of this example was the same as that shown in FIG. 1. In this example, the diameter of a shaft was set at 80 mm; length in an axial direction of the sliding surface 10 was set at 0.5 mm; the maximum height of the first screw projection 12 was set at 240 µm; and the height of the second screw projection 13 was set at 35 µm. The first screw projections 12 and the second screw projections 13 were arranged at equal intervals on the peripheral surface of the seal lip 7, respectively.

A comparative example 1 shows a conventional sealing device shown in FIG. 8 in which screw projections 103 each formed in the shape of a combination of the parallel screw and the ship bottom screw were formed at equal intervals on the atmosphere side sliding surface 102 of a wedge-shaped lip 101. Here, the diameter of a shaft was set at 80 mm and the maximum height of the screw projection 103 was set at 180 μm.

Figure 6:
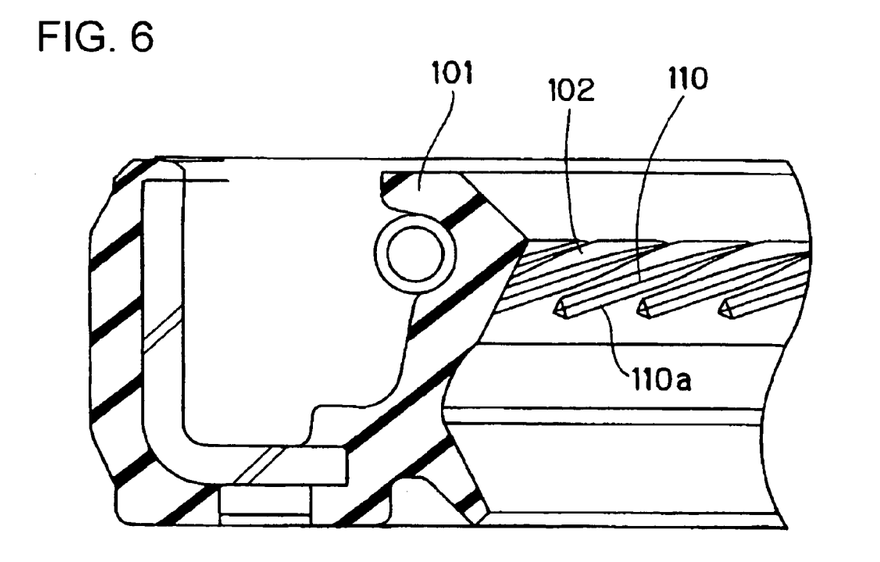
FIG. 6 is a cross-sectional view of a sealing device in accordance with a comparative example 2.

FIG. 6 shows a sealing device of a comparative example 2. In the comparative example 2, screw projections 110 each formed in the shape of a combination of the parallel screw and the ship bottom screw were formed at equal intervals on the atmosphere side sliding surface 102 of a wedge-shaped lip 101. However, in the comparative example 2, the same equal width portion 110a as in the example was formed in a portion of the ship bottom screw to set the maximum height of the screw projection 110 at 240 μm and the diameter of a shaft was set at 80 mm.

Three sealing devices of the example, the comparative examples 1, 2 were fitted on a shaft sealing portion and the quantity of pump was measured under conditions that: eccentricity of a shaft was 0.1 mm TIR; mounting eccentricity was 0.2 mm TIR; oil was 10W-30 of CD class; oil temperature was 120° C.; quantity of oil was center of shaft; and the number of revolutions was 3000 rpm. Test durations were set as appropriate according to the quantity of leakage in the respective tests.

Figure 7:
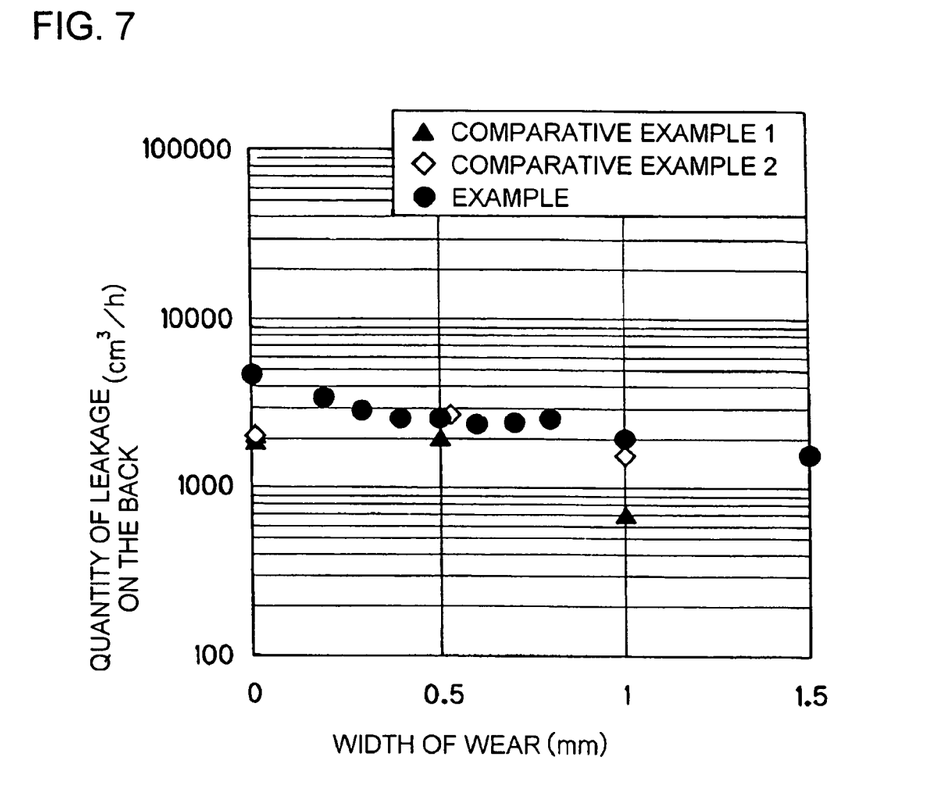
FIG. 7 is a graph showing the result of a comparative test of the quantity of pump.

The result of a comparative test of the quantity of pump is shown in FIG. 7. Comparing of the quantity of leakage on the back at the early stage of an operation, it is found that this example shows an improvement in the quantity of pump as compared with the comparative examples 1, 2. Moreover, comparing of the quantity of leakage on the back when wear progresses, it is found that this example shows an extremely small decrease in the quantity of pump as compared with the comparative examples 1, 2. That is, it is found that the employment of the construction of this example can exert excellent sealing ability produced by the screw pump effect at the early stage and for permanence for a long period.

DESCRIPTION OF THE REFERENCE NUMERALS 1 sealing device
2 housing
3 shaft
4 reinforcing ring
4a cylindrical portion
4b inward flange portion
5 sealing main body
6 outer peripheral seal portion
7 seal lip
8 dust lip
9 sealed object side slope surface
10 sliding surface
11 atmosphere side slope surface
12 first screw projection
12a cutout portion
12b increasing width portion
12c equal width portion
12d rear end portion
13 second screw projection
14 garter spring
15 ship bottom screw
16 cutter
17a tip side cutout portion
17b arc-shaped portion
17c rear end side cutout portion
18 cutting surface
19 side surface
20 molding die
21 depression
22 first screw projection
22a cutout portion
22b increasing width portion
22c equal width portion
A atmosphere side
O sealed object side

The invention claimed is:

1. A sealing device for tightly sealing an annular space between two members combined with each other in such a way as to rotate relatively to each other and having a seal lip sliding on a peripheral surface of one member of the two members, the sealing device comprising:
   a sliding surface along the peripheral surface;
   an atmosphere side slope surface sloping to gradually enlarge a space with respect to the peripheral surface from an atmosphere side end edge of the sliding surface;
   first screw projections formed on the atmosphere side slope surface and the sliding surface, the first screw projections extending from the atmosphere side slope surface to a middle of the sliding surface; and
   second screw projections formed on the sliding surface,
   an end on a sliding surface side of the first screw projections being formed on the sliding surface, and a first portion on a slope surface side of the first screw projections having a shape in which a height increases toward an atmosphere side with a width kept at a nearly equal width, the first portion of the first screw projections having a cross section of a nearly pentagonal shape formed of parallel extending side walls terminating at a triangular shaped apex.

* * * * *